United States Patent [19]
Oddsen, Jr.

[11] Patent Number: 6,076,785
[45] Date of Patent: Jun. 20, 2000

[54] ERGONOMIC SIT/STAND KEYBOARD SUPPORT MECHANISM

[75] Inventor: Odd N. Oddsen, Jr., Easton, Pa.

[73] Assignee: Innovative Office Products, Inc., Easton, Pa.

[21] Appl. No.: 08/808,852

[22] Filed: Feb. 28, 1997

Related U.S. Application Data

[60] Provisional application No. 60/012,525, Feb. 29, 1996.

[51] Int. Cl.[7] .................................................. B43L 15/00
[52] U.S. Cl. ................................... 248/118.3; 248/118.5; 248/280.11; 248/281.11
[58] Field of Search ................................ 248/118.1, 118, 248/118.3, 118.5, 248, 279, 284, 281.1, 284.1, 918, 274.1; 108/25, 50, 93, 138

[56] References Cited

U.S. PATENT DOCUMENTS

| | | | |
|---|---|---|---|
| 2,545,515 | 3/1951 | Gannett et al. | 108/138 |
| 3,436,046 | 4/1969 | Valeska | 248/284.1 |
| 4,616,798 | 10/1986 | Smeenge et al. | 248/281 |
| 4,632,349 | 12/1986 | Anstey | 248/281.1 |
| 4,691,886 | 9/1987 | Wendling et al. | 248/183 |
| 4,706,919 | 11/1987 | Soberalski et al. | 248/281.1 |
| 4,826,123 | 5/1989 | Hannah et al. | 248/248 |
| 5,037,054 | 8/1991 | McConnell | 248/284 |
| 5,074,501 | 12/1991 | Holtta | 248/118.3 |
| 5,211,367 | 5/1993 | Musculus | 248/279 |
| 5,257,767 | 11/1993 | McConnell | 248/284 |
| 5,273,250 | 12/1993 | Pemberton | 248/918 |
| 5,292,097 | 3/1994 | Russell | 248/281.1 |
| 5,351,897 | 10/1994 | Martin | 244/118 |
| 5,402,972 | 4/1995 | Schmidt | 248/118 |
| 5,437,235 | 8/1995 | Randolph | 108/25 |
| 5,462,247 | 10/1995 | Aldrich | 248/118 |
| 5,513,579 | 5/1996 | Allan | 108/93 |
| 5,582,375 | 12/1996 | Martin | 248/118.3 |
| 5,704,299 | 1/1998 | Corpuz, Jr. et al. | 108/50 |

*Primary Examiner*—Ramon O. Ramirez
*Assistant Examiner*—Tan Le
*Attorney, Agent, or Firm*—J. P. Blasko Professional Corp.; John P. Blasko

[57] ABSTRACT

An ergonomically adjustable sit/stand keyboard arm apparatus is disclosed. The apparatus is slidably mounted on the underside of a work surface such as a table. A first rotatable housing depends from the sliding mount. The first housing is connected to a second housing by a parallel linkage means. A keyboard platform is rotatably mounted on the second housing. An extender is provided between the second housing and the keyboard platform to raise the keyboard platform to sufficient height for use by the operator while standing and to permit the arm to be lowered below a generally horizontal orientation. The keyboard platform is maintained in position by a self-locking pneumatic cylinder and an adjustable cylinder assembly for counterbalancing the load on the parallel linkage mechanism.

20 Claims, 4 Drawing Sheets

ERGONOMIC SIT/STAND KEYBOARD SUPPORT MECHANISM

CROSS-REFERENCE

This application claims the benefit of U.S. Provisional Application No. 60/012,525 filed on Feb. 29, 1996 entitled "Double Articulating Keyboard Support Mechanism," of which Odd N. Oddsen, Jr. is the named inventor. The aforementioned application is incorporated herein by reference, but is not admitted to be prior art.

FIELD OF THE INVENTION

The present invention relates to an apparatus for ergonomically adjustable keyboard support that may be stored under a work surface and moved from beneath the work surface to a convenient orientation for the user and, more particularly, to an apparatus for providing adjustment for use of a computer keyboard when the user is sitting or when the user is standing.

BACKGROUND AND BRIEF DESCRIPTION OF THE INVENTION

Adjustable keyboard supports which may be mounted under a work surface are generally known. One example of such a keyboard support is disclosed in U.S. Pat. No. 4,826,123 to Hannah et al. The keyboard support disclosed in the '123 patent is mounted on a sliding track attached to the underside of a work surface such as a desk. A rear housing is pivotally coupled to a front housing by a parallel link mechanism. A keyboard support platform is pivotally connected to the front housing. A gas cylinder is used to provide motive power in raising the keyboard support platform and manual force is required for lowering the support platform. The gas cylinder is actuated by a rod passing through the link assembly and bears on an activating button at the end of the gas cylinder. The keyboard support mechanism of the '123 is directed to positioning the keyboard platform in front of and below the work surface.

The present invention, on the other hand, provides a support mechanism which permits the user to position the keyboard support platform not only in front of the work surface but also well above the work surface. Thus, the operator may move the support platform to a position high enough for the operator to use the keyboard while standing. Unlike prior art mechanisms which require activating levers or friction locks to release or set the position of the keyboard support platform, the position of the platform in the present invention is maintained by a self-locking gas cylinder within a parallel linkage. The gas cylinder is adjusted to provide sufficient counterbalancing force to the weight of the keyboard, keyboard support platform, and parallel linkage assembly.

By counterbalancing the weight of the support assembly and utilizing a self-locking gas cylinder, the present invention eliminates or reduces the need for a separate locking mechanism and provides substantial ergonomic advantages over the prior art. Less manipulation of the device is required by an operator and the keyboard support mechanism is therefore more likely to be oriented in an ergonomically desirable position. In contrast, if operators are required to loosen or tighten various locking mechanisms, they may be reluctant to alter the orientation of the platform and thus risk injury from typing on the keyboard in an awkward and harmful position.

The invention provides an ergonomically adjustable sit/stand keyboard arm apparatus. The apparatus is slidably mounted on the underside of a work surface such as a table. A first rotatable housing depends from the sliding mount. The first housing is connected to a second housing by a parallel linkage means. A keyboard platform is rotatably mounted on the second housing. An extender is provided between the second housing and the keyboard platform to raise the keyboard platform to sufficient height for use by the operator while standing and to permit the arm to be lowered below a generally horizontal orientation. The keyboard platform is maintained in position by a self-locking pneumatic cylinder and an adjustable cylinder assembly for counterbalancing the load on the parallel linkage mechanism.

The invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DETAILED DESCRIPTION OF THE PREFERRED EMBODIMENT

Figure 1:
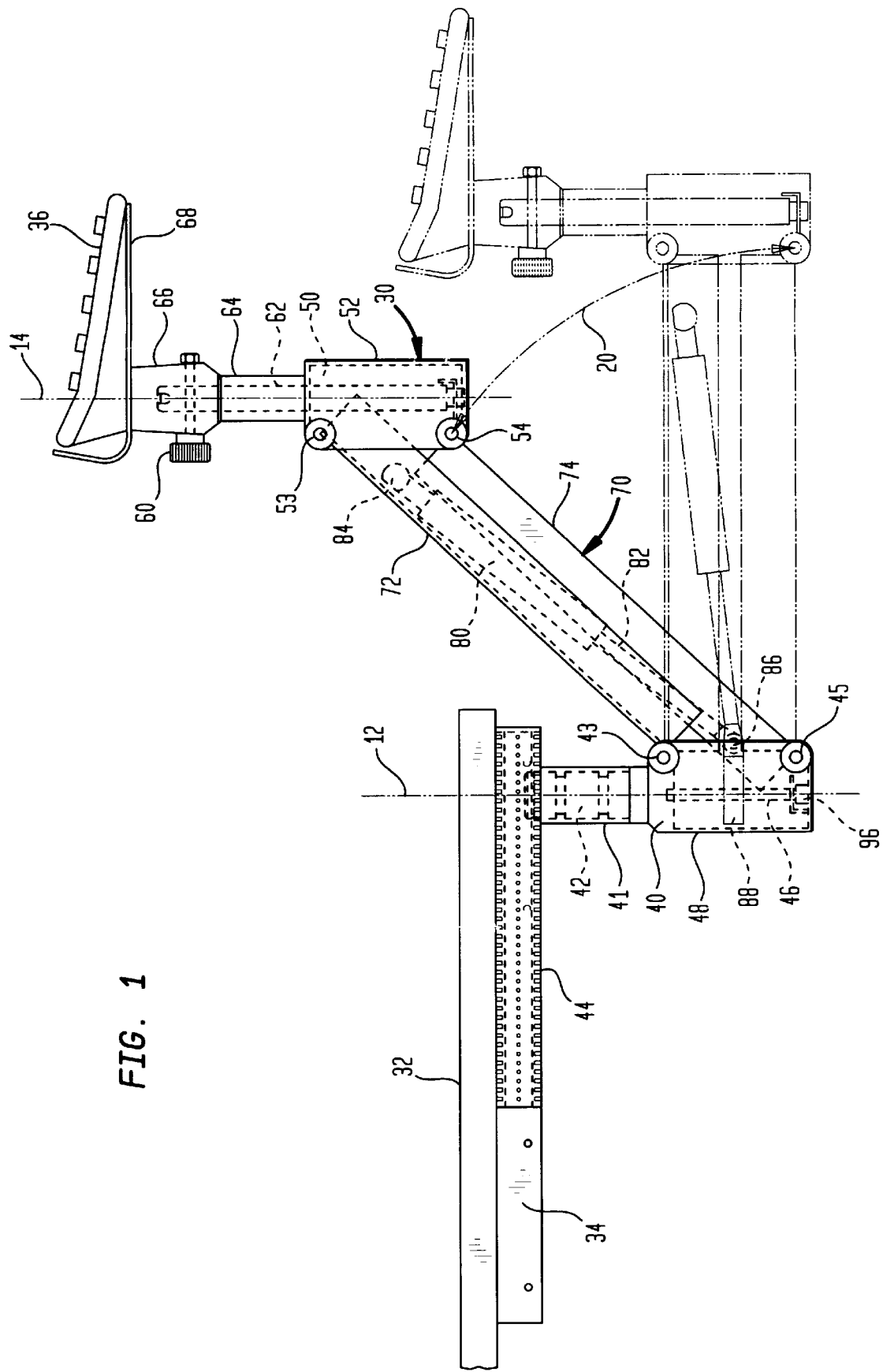
FIG. 1 is a side elevation view of an apparatus according to the invention.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 6 in particular, the apparatus of the present invention is disclosed.

FIG. 1 shows keyboard support mechanism 30 of the present invention. Support mechanism 30 comprises a front housing assembly 50 coupled to a rear housing assembly 40 by parallel linkage assembly 70. Rear housing assembly 40 is pivotally mounted on slide plate 44 which in turn is slidably mounted in slide track 34. Slide track 34 is attached underneath the work surface 32 such as a table.

Rear housing assembly 40 pivots about axis 12 on post 42 which extends from slide plate 44 to rear coupler 48. Upper member 72 and lower member 74 of parallel linkage assembly 70 are pivotally connected to rear coupler 48 at pins 43 and 45, respectively. Preferably, upper and lower members of linkage assembly 70 have a U-shaped cross-section with the exterior width of one member being less than interior width of the other, thereby permitting at least a portion of one member to recede or nest within a portion of the U-shaped cavity of the other member. This arrangement is illustrated in FIGS. 1, 2, 5 and 6.

The upper and lower members 72 and 74 are pivotally connected to front coupler 52 at pins 53 and 54, respectively. Platform support assembly 66 is mounted on post 62. Post 62 extends through spacer 64 into a hole on the top surface of front coupler 52 and is seated in a hole at the bottom of coupler 52. Keyboard platform 68 is attached to platform assembly 66. Thus keyboard platform 68 is rotatable about axis 14. Optionally, platform support assembly 66 may be tilted relative to post 62 by adjusting clamping means 60. Preferably, the range of tilt will not exceed 15 degrees from horizontal.

Figure 2:
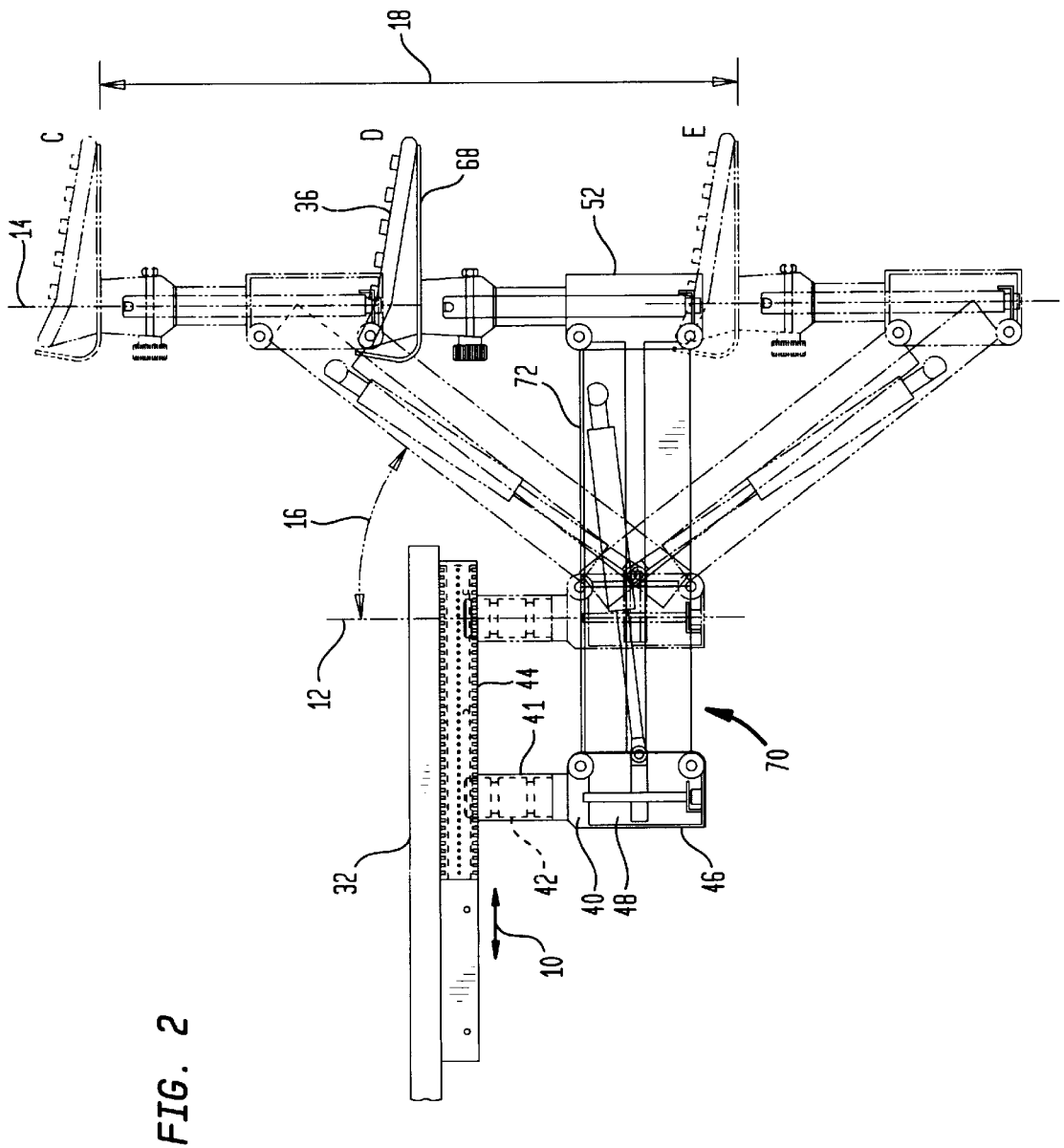
FIG. 2 is another side elevation view of the keyboard support mechanism according to the invention illustrating the positioning of the keyboard platform for use by an operator while sitting or standing.

With reference to FIGS. 1 and 2, rear post 42 is covered by rear extension member 41 and positions rear coupler 48 sufficiently below slide plate 44 such that parallel link assembly 70 can be angled steeply enough to raise keyboard 36 to position C for use while the operator is standing. Position D is the position at approximately the same height as work surface 32.

Position C is typically 10 to 14 inches above the work surface 32. By permitting a sufficiently acute angle 16 between axis 12 and parallel linkage assembly 70, keyboard 36 is not significantly distanced from the front edge of work surface 32 and the operator does not have to step back from the work surface to use the keyboard. Furthermore, the top surface of upper member 72 of parallel linkage assembly 70 does not collide with the front edge of work surface 32. Thus keyboard 36 may be raised or lowered to positions C and E respectively and remain equidistant to the plane transverse to the edge of work surface 32. This is accomplished by sliding rear housing assembly 40 as indicated by arrow 10, and more particularly as slide plate 44 slides within slide track 34, as keyboard platform 68 is raised or lowered. The preferred distance 18 from an ergonomic standpoint between lowered position E and raised position C is twenty-one inches (53.4 cm). The parallel linkage 70 of the rear housing assembly 40 and front housing assembly 50 permits keyboard platform 68 to remain in the same general orientation as platform 68 is moved longitudinally along axis 14.

The extension of keyboard platform 68 above front coupler 50 also provides an important advantage. Extender 64 and platform assembly 66 cooperate to raise keyboard platform 68 above the top surface of front coupler 52 thereby permitting keyboard platform 68 to be lowered across the full range of distance 18. If the keyboard platform 68 were mounted directly on the top surface of front coupler 52, the downward range of motion would be limited because the back edge of keyboard platform 68 would collide with the upper surface of upper member 72 when parallel linkage assembly was in a generally horizontal position. This in turn could impede the ability to store keyboard 36 underneath work surface 32. Also, upper and lower members 72 and 74 would have to be lengthened in order to achieve the necessary height for the keyboard to be used while standing. This in turn would result in the keyboard being positioned farther away from the front edge of work surface 32.

Figure 3:
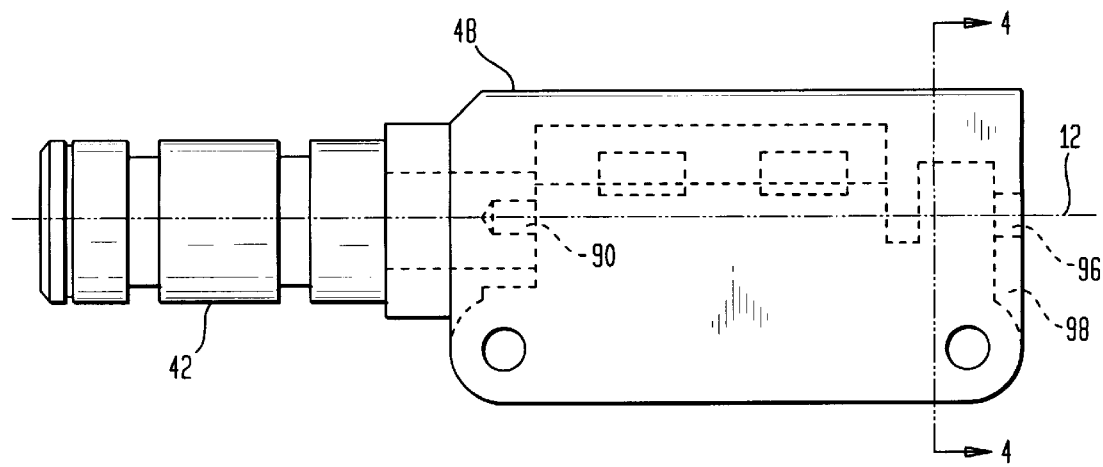
FIG. 3 is a side elevation view of the rear coupler and rear post of the rear assembly of the keyboard support mechanism.
Figure 4:
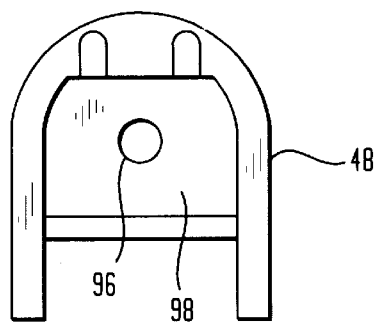
FIG. 4 is a cross-sectional view of the rear coupler taken along line 4—4 in FIG. 3.
Figure 5:
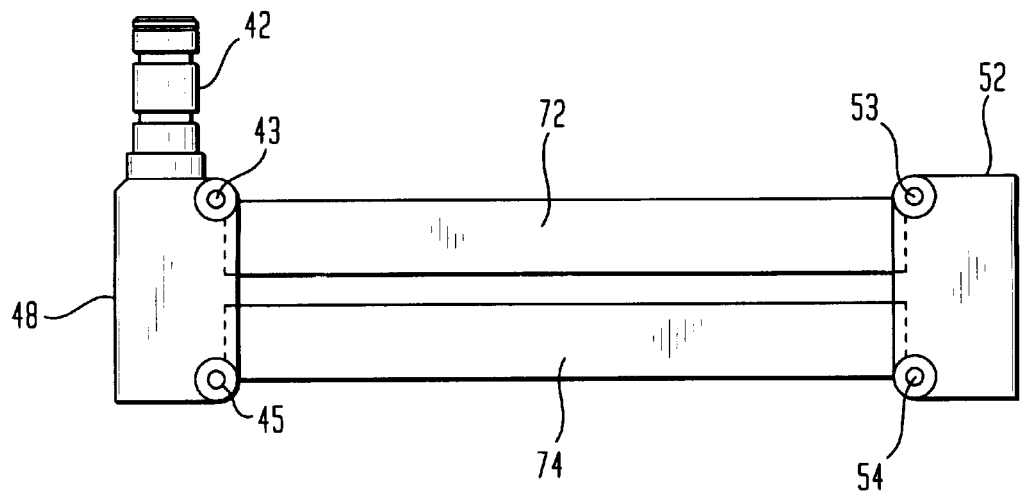
FIG. 5 is a side elevation view of the parallel linkage assembly of the invention.
Figure 6:
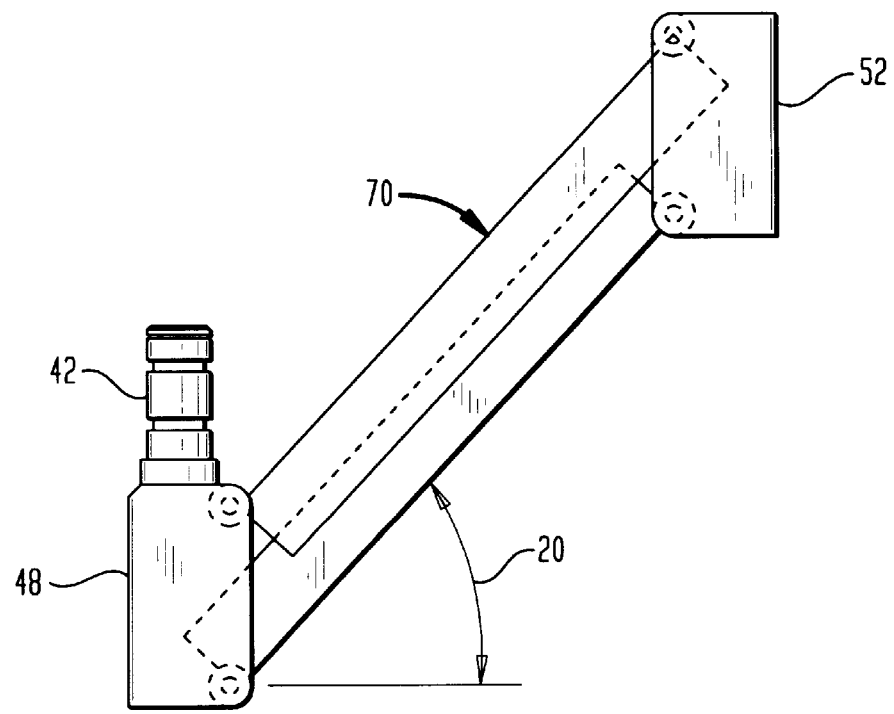
FIG. 6 is another side elevation view of the parallel linkage assembly in a pivoted position.

With reference to FIGS. 1, 3 and 4, the position of the keyboard is maintained by a gas cylinder assembly which forms part of parallel linkage assembly 70. A pneumatic cylinder 80 is attached at ball joint 84 to upper member 72. Piston 82 of pneumatic cylinder 80 is pivotally attached at pin 86 to cylinder support 88 (clevis). Cylinder support 88 has a threaded hole through which adjustable screw shaft 46 is threaded. Shaft 46 is seated within aperture 90 at the top of the interior of rear coupler 48 above and aligned with hole 96 in bottom wall 98 of rear coupler 48. Shaft 46 has a means for effectuating rotation of shaft 46 such as a hex slot which is accessible through hole 96. Thus, cylinder support 88 may be adjustably moved along the length of shaft 46 by rotating shaft 46. In order to optimize the stability of the overall mechanism and prevent parallel linkage assembly 70 from wobbling, shaft 46 is preferably positioned to rotate about the same axis 12 as post 42.

By means of the above-noted gas cylinder assembly, the force exerted by pneumatic cylinder 80 may be adjusted, i.e., by raising or lowering cylinder support 88. The force is preferably adjusted to counterbalance the load exerted by the weight of the parallel linkage assembly and all other components mounted thereon, e.g., post 62, keyboard support assembly 66, keyboard platform 68 and keyboard 36. The adjustability of this force by means of rotating shaft 46 provides significant advantage in that the load on the front end of the parallel linkage assembly 70 may vary from one installation to another.

Different types of platforms or different devices such as keyboards, monitors or the like may be attached to the front coupler 50 and will depend on the particular installation. The initial choice of the cylinder force will depend on the intended installation. Pneumatic cylinders which exert forces within the range of 100 to 1000 Newtons are suitable for loads of 10 to 50 pounds. Therefore, a 300 Newton cylinder would be suitable for a typical keyboard platform, while a 800 to 1000 Newton cylinder would be required for a heavier load such as a computer monitor. Fine adjustment of the force may be made to the gas cylinder assembly as indicated above by adjustment of shaft 46 at the time of installation so that the load is suitably counterbalanced.

Preferably, a self-locking pneumatic cylinder such as those available from Suspa Co. of Ann Arbor, Mich. are used. Unlike pneumatic cylinders which have a levered locking mechanism, the self-locking cylinder locks in a position when the piston is in a rest position, i.e., it is no longer moving. In order to initiate further movement, a force must be exerted on the piston to overcome the locked state. Thereafter, the pneumatic cylinder responds in the same manner as a typical pneumatic cylinder and exerts a generally constant and predetermined force. Thus, when the cylinder is in an unlocked state, the keyboard may be moved in a "free-floating" manner due to the counterbalancing force of the pneumatic cylinder. When movement of the keyboard ceases, the cylinder locks and remains locked until sufficient force is exerted to overcome the locked state.

This provides an important advantage in the present keyboard support mechanism. Because some pressure is exerted by the act of typing on the keyboard, the position of the keyboard would tend to be altered in the absence of a locking mechanism. However, the forces exerted by typing are typically less than the force necessary to overcome the locked state of the self-locking cylinder. If a standard pneumatic cylinder is used in the counterbalancing gas cylinder assembly, a locking mechanism such as a friction lock must be used to prevent the inadvertent repositioning of the keyboard end of the support mechanism. This would require the operator to manually lock or unlock the assembly each time the operator desired to adjust the position of the keyboard. By using a self-locking cylinder in the adjustable counterbalancing system of the present invention, no such manipulation of a manual lock is required.

While the keyboard support mechanism illustrated in FIGS. 1 and 2 is shown as being attached to the work table by a slidable connection, one skilled in the art will readily recognize that the keyboard support mechanism could be attached by other means such as a C-clamp or other fixed position attachments. However, the positioning of the keyboard platform relative to the fixed attachment would be limited to positions along arc 20 as shown in FIG. 1.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. An adjustable support apparatus for supporting a computer keyboard adjacent an associated work surface, the work surface having an underside and a front edge, the apparatus comprising:

parallel link means having forward and rearward portions, the parallel link means having an upper member and a lower member;

a mounting bracket adapted for attachment to the underside of the work surface;

a rear housing pivotally and slidably attached to the mounting bracket and adapted for pivotal attachment to the rearward portion of the parallel link means;

a front housing adapted for pivotal attachment to the forward portion of the parallel link means;

a keyboard support platform pivotally attached to the front housing;

lift assist means for assisting in lifting the keyboard support platform, the lift assist means including a pneumatic cylinder located within the parallel link means for counterbalancing the weight of the keyboard placed on the keyboard support platform, a clevis attached to one end of the pneumatic cylinder, and a threaded shaft in threaded engagement with the clevis, wherein the clevis slides up and down the threaded shaft in response to the threaded shaft rotating; and means for releasably locking the parallel link means at a selected position;

wherein the attachment of the rearward portion of the parallel link means to the rear housing is spaced sufficiently below the underside of the work surface to permit the positioning of the keyboard support platform adjacent to the vertical plane at the front edge of the work surface in a range of positions extending from the work surface to a position substantially above the work surface; and wherein the threaded shaft and the clevis are located within the rear housing, and a desired position of the one end of the pneumatic cylinder within the rear housing is selected by rotating the threaded shaft until the pneumatic cylinder substantially counterbalances the weight of the keyboard.

2. The keyboard support apparatus of claim 1, wherein the range of positions extends from the work surface to a point between ten and fourteen inches above the work surface.

3. The keyboard support apparatus of claim 1, wherein the keyboard support platform is spaced sufficiently above the attachment of the forward portion of the parallel link means to the front housing to permit the keyboard support platform to be lowered below the underside of the work surface.

4. The keyboard support apparatus of claim 1, wherein the locking means is incorporated in the pneumatic cylinder such that the pneumatic cylinder is a self locking pneumatic cylinder.

5. An adjustable support apparatus for supporting a device adjacent to a work surface having an underside and a front edge, the apparatus comprising:

a parallel linkage assembly having a first end and a second end;

a mounting bracket adapted for attachment to the underside of the work surface;

a first housing rotatably and slidably attached to the mounting bracket and pivotally attached to the first end of the parallel linkage assembly, the first housing including a threaded shaft and a clevis in threaded engagement with the threaded shaft, wherein the clevis slides within the first housing in response to rotation of the threaded shaft;

a second housing pivotally attached to the second end of the parallel linkage assembly;

a support platform rotatably and pivotally attached to the second housing; and a pneumatic cylinder having a first end and a second end, the first end movably connected to the first housing via the clevis and the second end connected to the parallel linkage assembly, wherein the location of the first end of the pneumatic cylinder within the first housing is selected so as to substantially counterbalance the weight of the device.

6. The apparatus of claim 5, wherein the parallel linkage assembly includes an upper channel and a lower channel.

7. The apparatus of claim 6, wherein the upper channel and the lower channel are substantially U-shaped.

8. The apparatus of claim 7, wherein the upper channel has an interior width that is larger than an exterior width of the lower channel, so that at least a portion of the lower channel can fit within the upper channel.

9. The apparatus of claim 6, wherein upper and lower surfaces of the upper and the lower channels are substantially parallel to each other.

10. The apparatus of claim 6, wherein the upper channel includes a ball joint and the second end of the pneumatic cylinder is connected to the ball joint.

11. The apparatus of claim 5, wherein the pneumatic cylinder is a self locking pneumatic cylinder.

12. The apparatus of claim 5, wherein the first housing further includes a hole in a lower surface thereof in alignment with the threaded shaft so as to provide access to the threaded shaft.

13. The apparatus of claim 12, wherein the threaded shaft has a shaped slot formed in an end thereof that is accessible through the hole in the lower surface of the first housing.

14. The apparatus of claim 5, wherein the attachment of the first end of the parallel linkage assembly to the first housing is spaced sufficiently below the underside of the work surface to permit positioning of the support platform adjacent to a vertical plane at the front edge of the work surface in a range of positions extending from the work surface to a position substantially above the work surface.

15. The apparatus of claim 5, wherein the attachment of the second end of the parallel linkage assembly to the second housing is spaced sufficiently below the support platform to permit positioning of the support platform adjacent to a vertical plane at the front edge of the work surface in a range of positions extending from the work surface to a position substantially below the work surface.

16. The apparatus of claim 5, wherein
the parallel linkage assembly includes an upper channel and a lower channel and the upper and the lower channels are substantially U-shaped and have upper and lower surfaces that are substantially parallel to each other;

the first housing further includes a hole formed in a lower surface thereof and the threaded shaft has a shaped slot formed in one side thereof that is externally accessible through the hole; and the pneumatic cylinder is a self locking pneumatic cylinder.

17. An adjustable support apparatus for supporting a device adjacent to a work surface having an underside and a front edge, the apparatus comprising:

a parallel linkage assembly having a first end and a second end, the parallel linkage assembly including a lift assist means for assisting in the lifting of the device by providing a force that counterbalances the weight of the device;

a mounting bracket adapted for attachment to the underside of the work surface;

a first housing rotatably and slidably attached to the mounting bracket and pivotally attached to the first end of the parallel linkage assembly, the first housing including a counterbalance adjustment means pivotally attached to one end of the lift assist means for adjusting the force applied by the lift assist means to one of a plurality of ranges along a continuum of ranges;

a second housing pivotally attached to the second end of the parallel linkage assembly; and a support platform pivotally attached to the second housing, wherein the force applied by the lift assist means is selected so as to substantially counterbalance the weight of the device on the support platform.

18. The apparatus of claim 17, wherein the counterbalance adjustment means comprises a clevis in threaded engagement with a threaded shaft, the clevis rotating up and down on the threaded shaft in response to rotation of the threaded shaft and the one end of the lift assist means sliding up and down within the first housing in response to the movement of the clevis, the force applied by the lift assist means varying depending on the location of the one end of the lift assist means within the first housing.

19. The apparatus of claim 17, wherein the lift assist means is a pneumatic cylinder.

20. The apparatus of claim 17, wherein the lift assist means is a self locking pneumatic cylinder.

* * * * *